United States Patent
Peretz (10) Patent No.: US 11,247,816 B2
(45) Date of Patent: Feb. 15, 2022

(54) SEALED STORAGE BOX WITH LATCHING CLOSURE

(71) Applicant: RL RND and IP Holdings Limited, Honk Kong (HK)

(72) Inventor: Micky Peretz, Tel Aviv (IL)

( * ) Notice: Subject to any disclaimer, the term of this patent is extended or adjusted under 35 U.S.C. 154(b) by 141 days.

(21) Appl. No.: 16/819,365

(22) Filed: Mar. 16, 2020

(65) Prior Publication Data

US 2021/0284400 A1   Sep. 16, 2021

(51) Int. Cl.
| | |
|---|---|
| *B65D 43/26* | (2006.01) |
| *B65D 43/02* | (2006.01) |
| *B65D 81/20* | (2006.01) |
| *B65D 39/12* | (2006.01) |
| *B65D 53/02* | (2006.01) |

(52) U.S. Cl.
CPC ............ *B65D 43/26* (2013.01); *B65D 39/12* (2013.01); *B65D 43/022* (2013.01); *B65D 53/02* (2013.01); *B65D 81/2015* (2013.01); *B65D 81/2038* (2013.01); *B65D 2543/0049* (2013.01); *B65D 2543/00203* (2013.01); *B65D 2543/00546* (2013.01)

(58) Field of Classification Search
CPC ...... B65D 43/26; B65D 43/022; B65D 53/02; B65D 45/327; B65D 39/12; B65D 45/34; B65D 45/02; B65D 81/2038

USPC ........................................................ 220/238
See application file for complete search history.

(56) References Cited

U.S. PATENT DOCUMENTS

| | | | |
|---|---|---|---|
| 2012/0285958 A1* | 11/2012 | Lee | B65D 45/327 220/235 |
| 2013/0037540 A1* | 2/2013 | Sze | B65D 43/022 220/237 |
| 2016/0280427 A1* | 9/2016 | Wu | B65D 41/0485 |
| 2020/0031544 A1* | 1/2020 | Choi | B65D 45/32 |

\* cited by examiner

*Primary Examiner* — Don M Anderson
*Assistant Examiner* — Jennifer Castriotta (57) ABSTRACT

A storage box that includes a container and a lid, which includes a bottom plate, a top plate, a top plate anchor and a movable latch. The bottom plate includes an arm that the height of its left section is bigger than the height of its right section, and its inclined middle section inclines from left to right. The movable latch includes a protrusion that its left section is flat and the inclined right section inclines and descends from left to right. The movable latch is designed to be positioned between the top plate and the bottom plate, in a way that the horizontal protrusion is inserted under the horizontal arm of the bottom plate and the movable latch can be moved from right to left and back.

1 Claim, 15 Drawing Sheets

SEALED STORAGE BOX WITH LATCHING CLOSURE

TECHNICAL FIELD

The present invention refers to a sealed storage box.

BACKGROUND ART

It is very common to use sealed storage boxes for food storage and other materials, and the market is hungry for new and efficient boxes of this kind. The present invention discloses a new and innovative sealed storage box.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The main object of the present invention is to provide a storage box (10) that includes a container (20) that is designed to contain food or other materials that the user wants to store, a lid (30) that is designed to cover and seal the top opening of the container and a circular seal (40).

Figure 1:
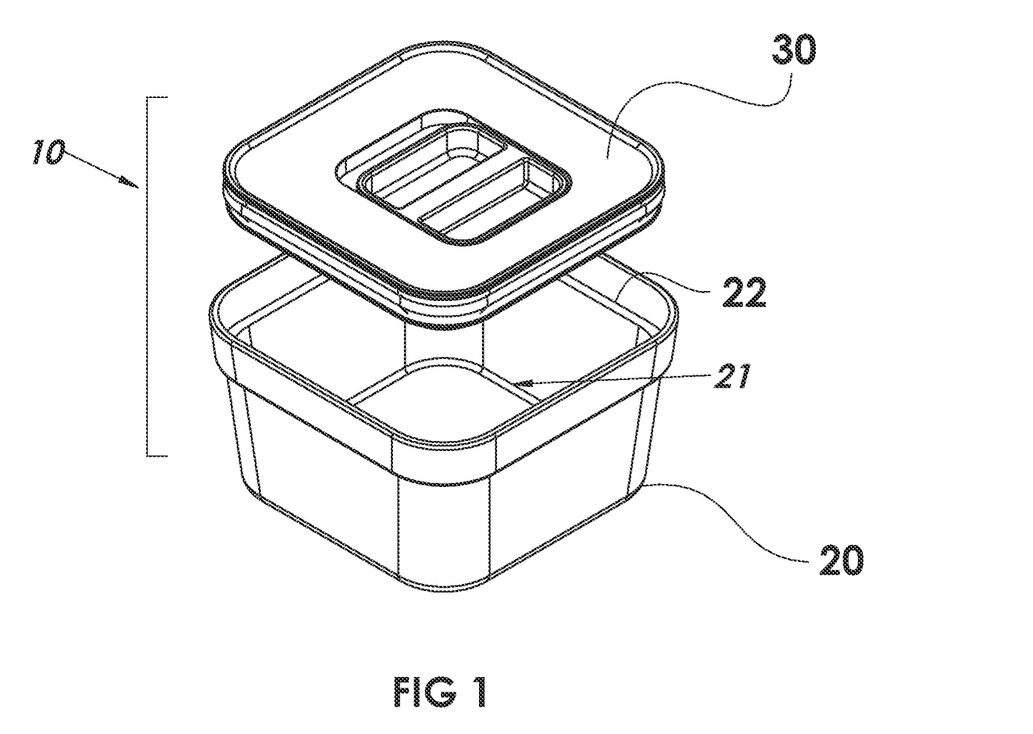
FIG. 1 depicts the storage box (10).
Figure 2:
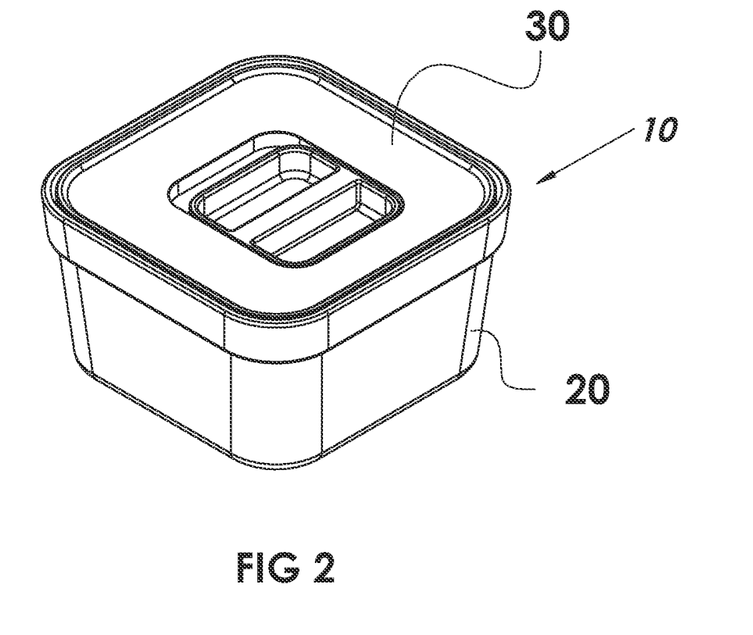
FIG. 2 depicts the storage box (10) in a close position.
Figure 3:
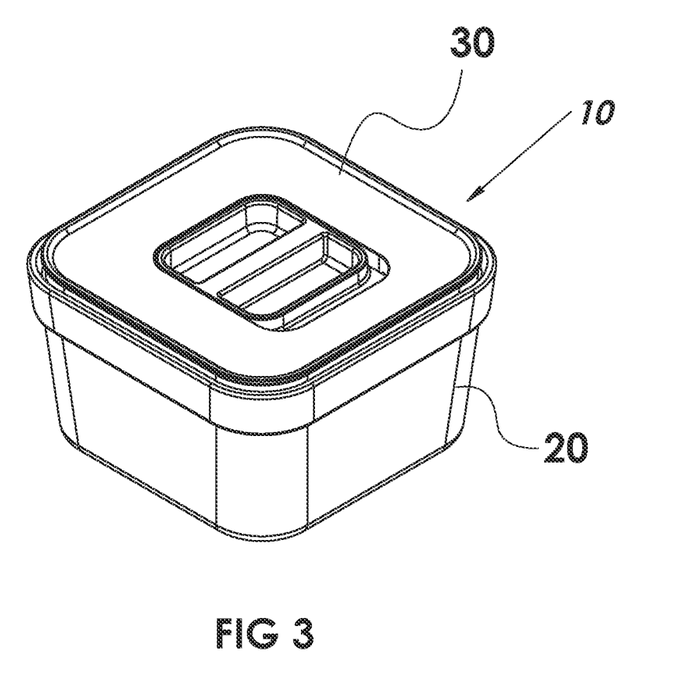
FIG. 3 depicts the storage box (10) in an open position.

The container (20) includes a top opening (21) and an inner peripheral shoulder (22) on which the lid (30) is designed to be positioned. FIG. 1 depicts the storage box (10) that includes the container (20) and the lid (30). FIG. 2 depicts the storage box (10) in a close position and FIG. 3 depicts the storage box (10) in an open position.

Figure 4A:
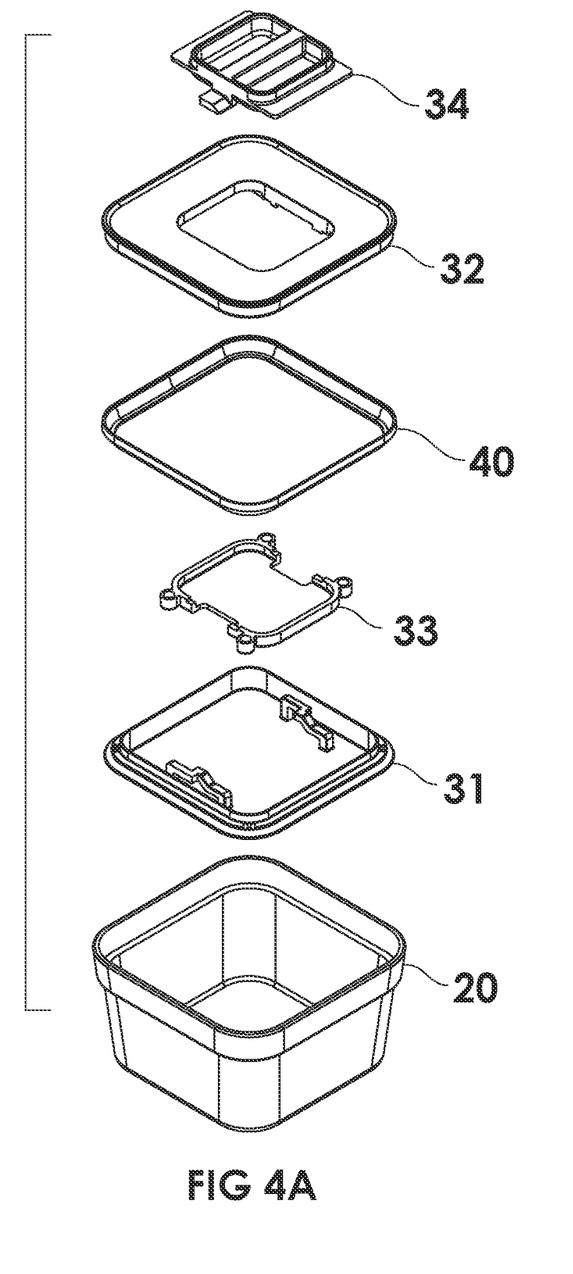
FIG. 4A is an exploded view of the storage box (10) and its parts.
Figure 4B:
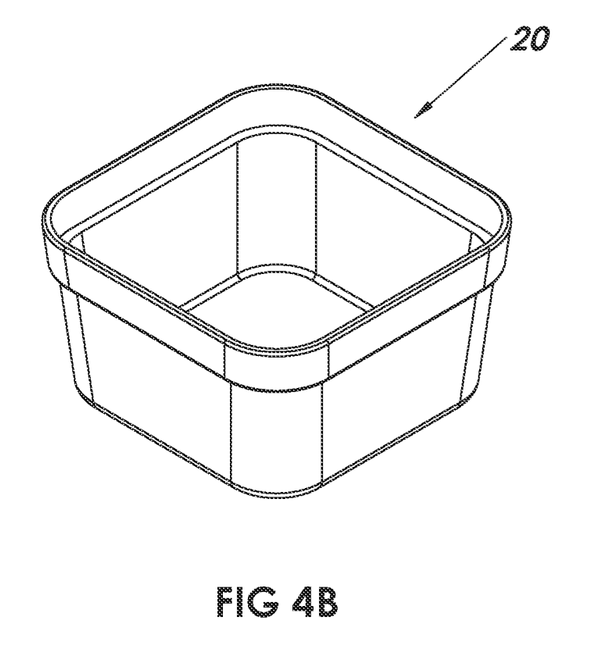
FIG. 4B depicts the container (20).
Figure 4C:
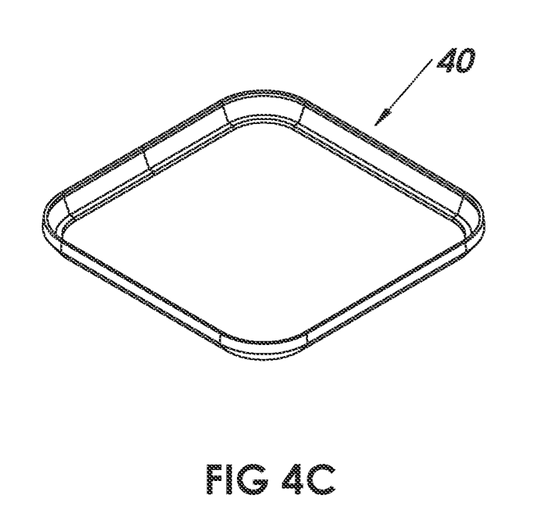
FIG. 4C depicts the circular seal (40).

The lid (30) includes a bottom plate (31), a top plate (32), a top plate anchor (33) and a movable latch (34). FIG. 4A is an exploded view of the storage box (10) and its parts, FIG. 4B depicts the container (20) and FIG. 4C depicts the circular seal (40).

Figure 5:
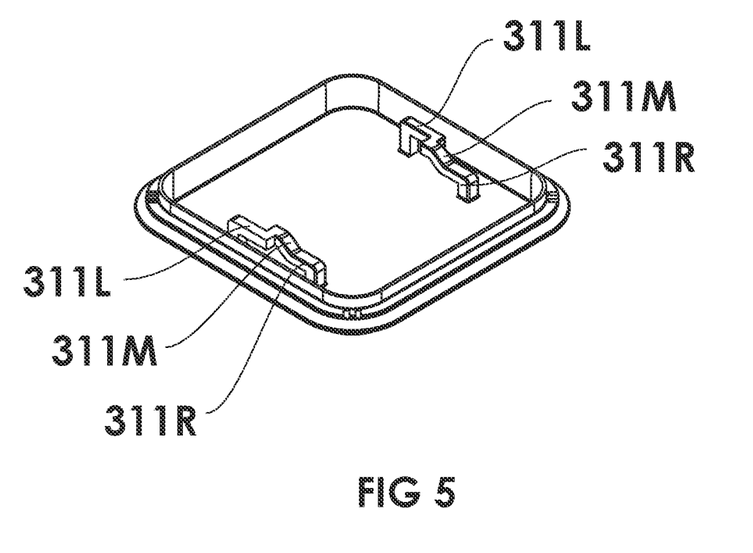
FIG. 5 depicts the bottom plate (31).

The bottom plate (31) includes a horizontal arm (311) that is vertically projected from the bottom plate in a way that the height (311HL) of the left section (311L) of the horizontal arm is bigger than the height (311HR) of the right section (311R), and the inclined middle section (311M) of the horizontal arm inclines and descends from left (L) to right (R). FIG. 5 depicts the bottom plate (31).

Figure 6:
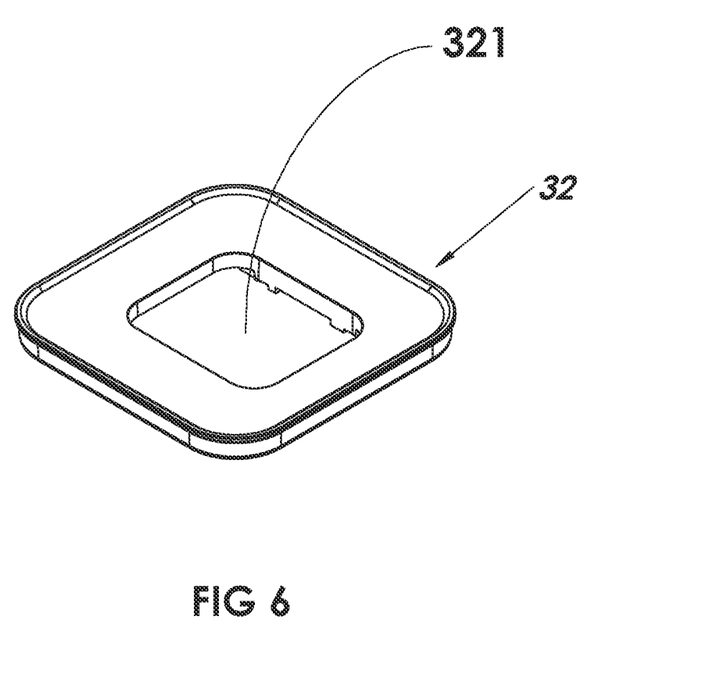
FIG. 6 depicts the top view of the top plate (32).
Figure 7:
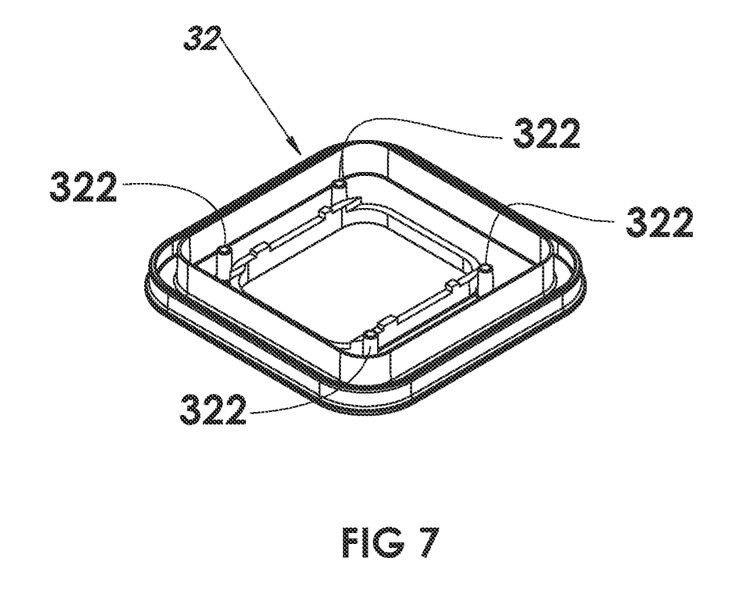
FIG. 7 depicts the bottom view of the top plate (32).

The top plate (32) includes a central hole (321) and one or more connectors (322) that are designed to connect the top plate to the top plate anchor (33). The connectors (322) can be of a variety of types such as pins, screws and the like, and the connectors in the drawings are a kind of conical pins that serve as an example. FIG. 6 depicts the top view of the top plate (32) and FIG. 7 depicts the bottom view of the top plate (32).

Figure 8:
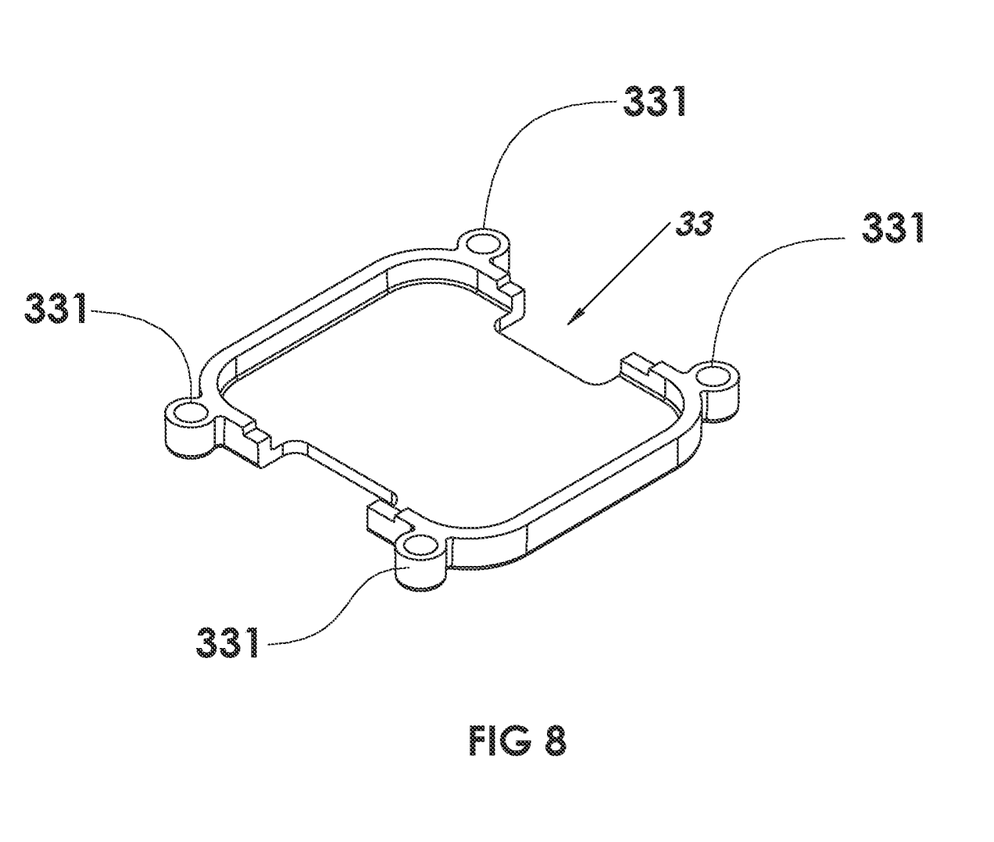
FIG. 8 depicts the top plate anchor (33).

The top plate anchor (33) is designed to be connected to the top plate (32) and to anchor the top plate to be part of the lid. The top plate anchor (33) includes one or more connecting means (331) that correspond with the connectors (322) of the top plate (32). The connectors (322) are designed to be connected to the connecting means (331). The connecting means (331) can be of a variety of types such as pins, screws and the like, and the connecting means in the drawings are a kind of conical holes that are designed to receive conical pins. FIG. 8 depicts the top plate anchor (33).

Figure 9:
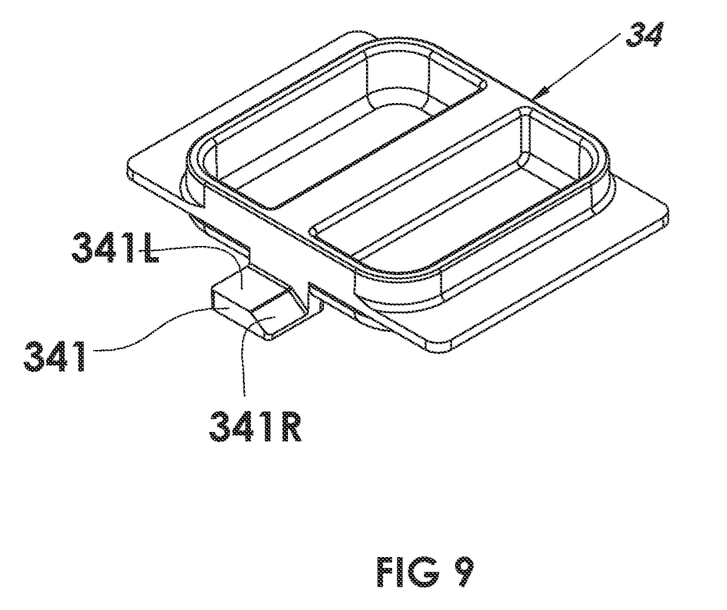
FIG. 9 depicts the movable latch (31).

The movable latch (34) includes a horizontal protrusion (341) that is horizontally projected from the movable latch in a way that the left section (341L) of the horizontal protrusion is flat and the inclined right section (341R) of the horizontal protrusion inclines and descends from left (L) to right (R). The height (341HR) of the right section (341R) of the horizontal protrusion (341) is equivalent or smaller than the height (311HL) of the left section of the horizontal arm (311). FIG. 9 depicts the movable latch (31).

The movable latch (34) is designed to be positioned between the top plate (32) and the bottom plate (31), in a way that the horizontal protrusion (341) is inserted under the horizontal arm (311) of the bottom plate (31). The movable latch (34) is designed to move from right to left and vice versa.

Figure 10A:
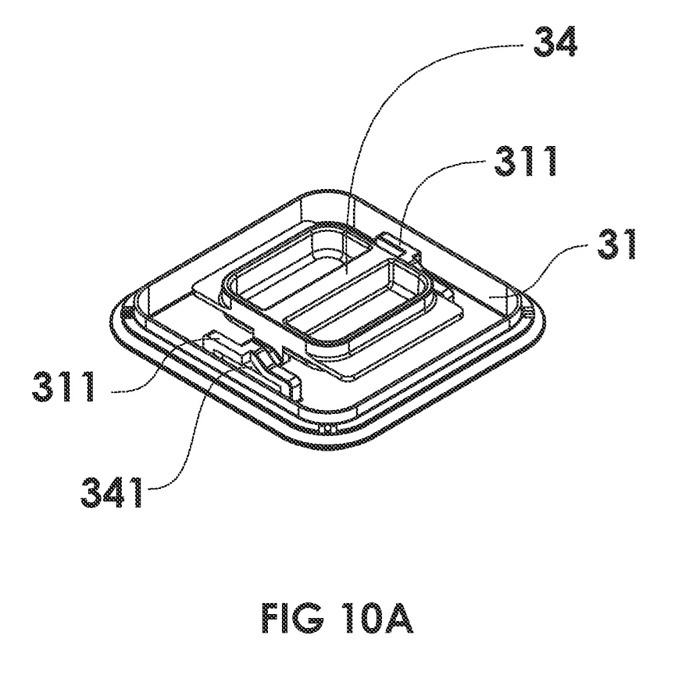
FIGS. 10A, 10C and 11B depict the horizontal arm (311) and the horizontal protrusion (341) in the open position.
Figure 10B:
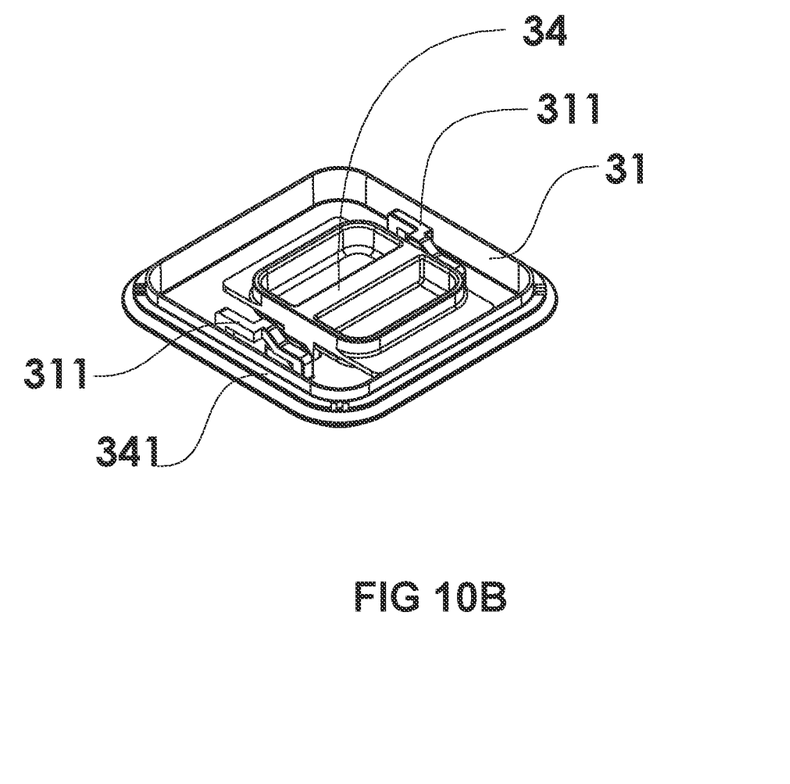
FIGS. 10B, 11A and 11C depict the horizontal arm (311) and the horizontal protrusion (341) in the close position.
Figure 10C:
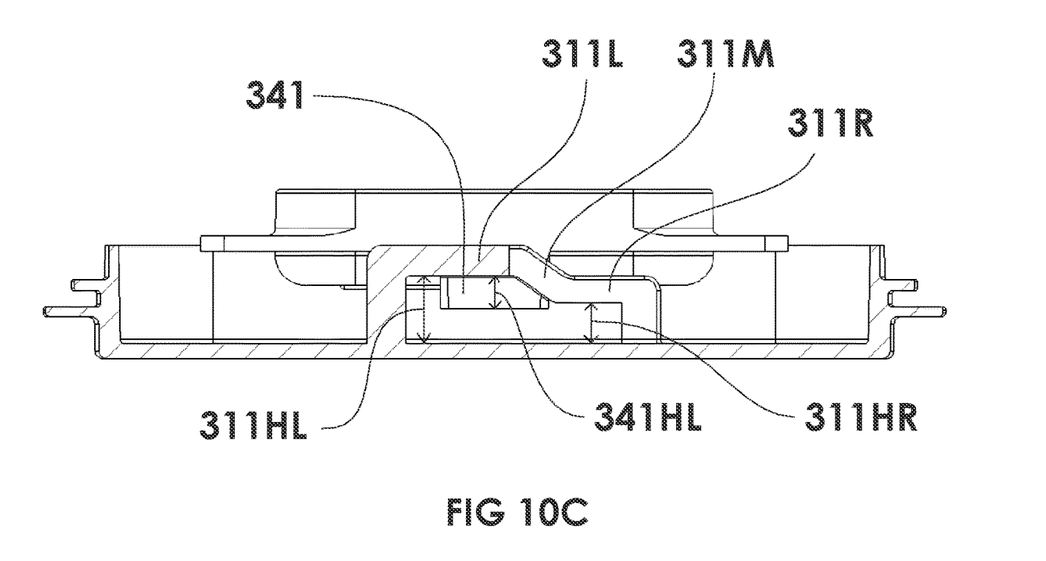
Figure 11A:
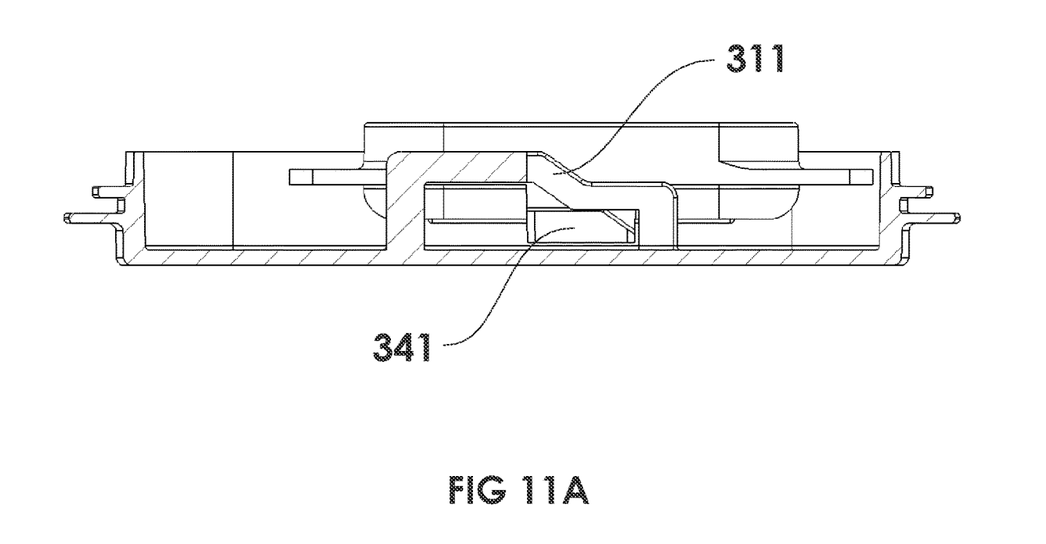
Figure 11B:
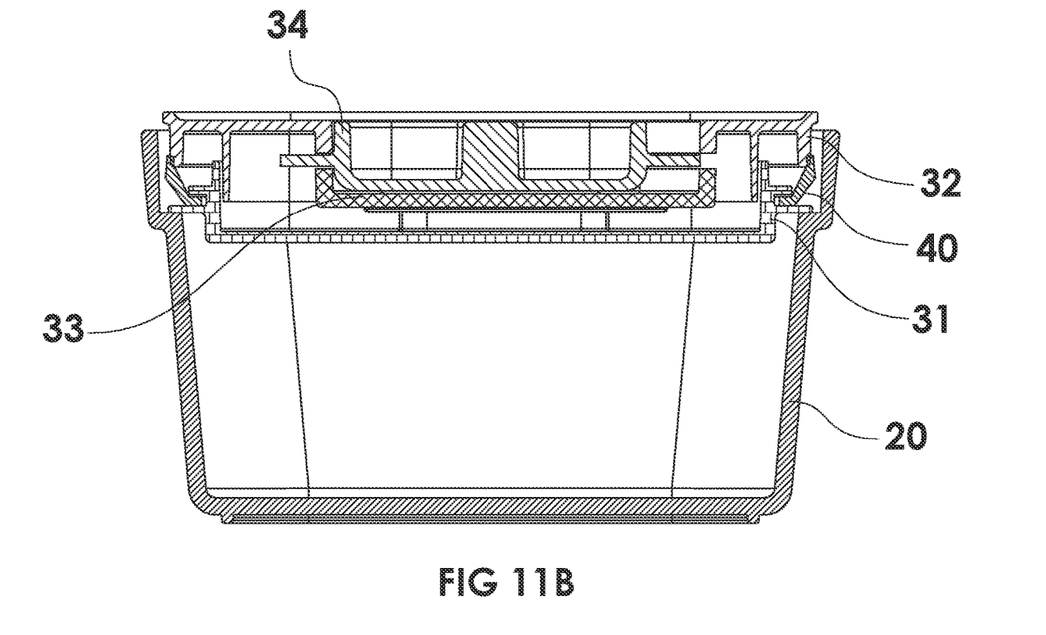

The horizontal protrusion (341) can be under the left section (311L) of the horizontal arm (311), which is the open position, as depicted for example in FIGS. 10A, 10C and 11B and in this position the top plate (32) can move upward. The horizontal protrusion (341) can be under the right section (311R) of the horizontal arm (311), which is the close position, as depicted for example in FIGS. 10B, 11A and 11C and in this position the top plate (32) is downwardly tight, due to the fact that the horizontal protrusion (341) is tight between the bottom plate to the right section (311R) of the horizontal protrusion (341). The horizontal protrusion (341) can be moved from right to left due to the inclination of the inclined right section (341R) of the horizontal protrusion and the inclined middle section (311M) of the horizontal arm (311).

Figure 11C:
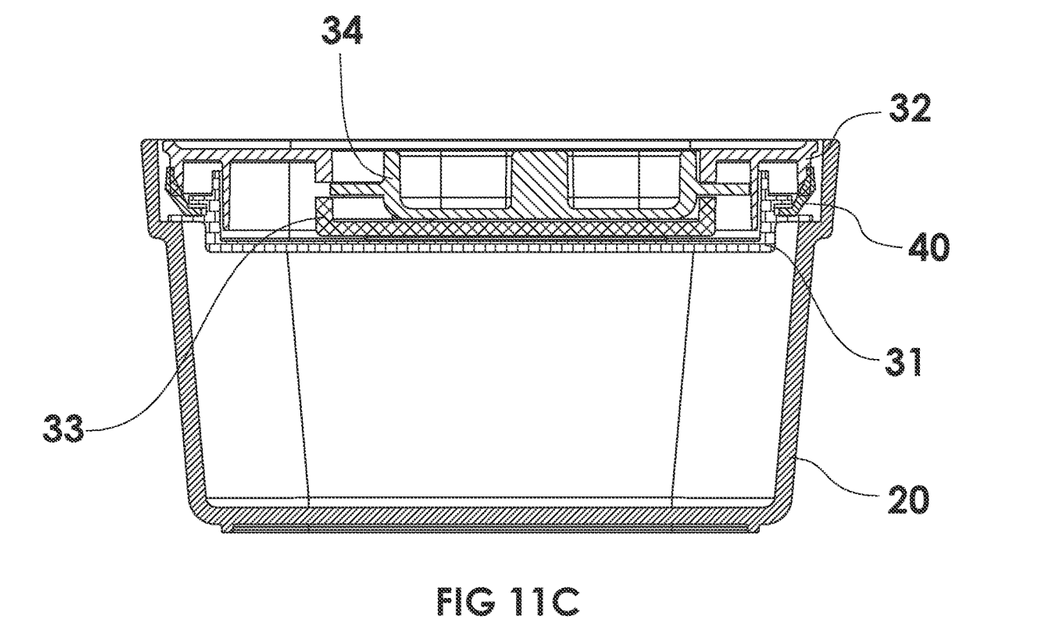

The circular seal (40) encloses the lid (30) and when the lid is in the close position, the top plate is in downward position and it presses and tightens the circular seal to the side wall of the container and the storage box is closed and sealed in this position, as depicted for example in FIG. 11C. When the lid is in the open position, the top plate is in upward position and it no longer tightens the circular seal to the side wall of the container and the storage box can be easily opened in this position, as depicted for example in FIG. 11B. The user can move the movable latch (34) that is accessible through the central hole (321) from right to left and by that to close and open the storage box (10).

Above and in the claims we use the terms "right" and "left" for the sake of fluency only and the invention and claims relate also to reversal directions. In addition, it is recommended that the storage box (10) will have two horizontal arms (311) and two corresponding horizontal protrusions (341).

What we claim is:

1. A storage box, comprising: a container that is designed to contain materials, a lid that is designed to cover and seal a top opening of the container and a circular seal that is designed to enclose the lid;
- wherein the container includes the top opening and an inner peripheral shoulder on which the lid is designed to be positioned;
- wherein the lid includes a bottom plate, a top plate, a top plate anchor and a movable latch;
- wherein the bottom plate includes a horizontal arm that is projected from the bottom plate in a way that a height of a left section of the horizontal arm is bigger than a height of a right section of the horizontal arm, and an inclined middle section of the horizontal arm inclines and descends from left to right;
- wherein the top plate includes a central hole and one or more connectors that are designed to connect the top plate to the top plate anchor;
- wherein the top plate anchor is designed to be connected to the top plate by one or more connecting means that correspond with the connectors of the top plate;
- wherein the movable latch includes a horizontal protrusion that is projected from the movable latch in a way that a left section of the horizontal protrusion is flat and an inclined right section of the horizontal protrusion inclines and descends from left to right; wherein a height of a right section of the horizontal protrusion is equivalent or smaller than the height of the left section of the horizontal arm;
- wherein the movable latch is designed to be positioned between the top plate and the bottom plate, in a way that the horizontal protrusion is inserted under the horizontal arm of the bottom plate, and wherein said movable latch can be moved from right to left and back.

* * * * *